US011327297B2

(12) United States Patent
Zhou et al.

(10) Patent No.: US 11,327,297 B2
(45) Date of Patent: May 10, 2022

(54) GENERATION METHOD FOR PROGRAMMABLE ANALOG FRINGE PATTERN WITH EXTENDED DEPTH OF FIELD

(71) Applicant: Xi'an Chishine Optoelectronics Technology Co., Ltd., Xi'an (CN)

(72) Inventors: Xiang Zhou, Xi'an (CN); Tao Yang, Xi'an (CN); Rui Jin, Xi'an (CN); Quan Li, Xi'an (CN); Tao Liu, Xi'an (CN); Li Ma, Xi'an (CN); Junqi Huang, Xi'an (CN); Huanhuan Li, Xi'an (CN)

(73) Assignee: Xi'an Chishine Optoelectronics Technology Co., Ltd., Xi'an (CN)

( * ) Notice: Subject to any disclaimer, the term of this patent is extended or adjusted under 35 U.S.C. 154(b) by 178 days.

(21) Appl. No.: 16/776,368

(22) Filed: Jan. 29, 2020

(65) Prior Publication Data

US 2020/0241287 A1    Jul. 30, 2020

Related U.S. Application Data

(63) Continuation of application No. PCT/CN2017/115010, filed on Dec. 7, 2017.

(51) Int. Cl.
*G02B 26/08* (2006.01)
*G02B 26/10* (2006.01)
(Continued)

(52) U.S. Cl.
CPC ........ *G02B 26/101* (2013.01); *G01B 11/2518* (2013.01); *G02B 26/0833* (2013.01); *G02B 27/30* (2013.01)

(58) Field of Classification Search
CPC .. G02B 26/101; G02B 26/0833; G02B 27/30; G02B 27/0075; G01B 11/2518; G01B 11/2536
(Continued)

(56) References Cited

U.S. PATENT DOCUMENTS

2004/0150837 A1    8/2004  Sugiyama
2006/0082852 A1    4/2006  Wine et al.
(Continued)

FOREIGN PATENT DOCUMENTS

CN    101310515 A    11/2008
CN    104395813 A    3/2015
(Continued)

OTHER PUBLICATIONS

International Search Report of PCT/CN2017/115010.
Written Opinion of PCT/CN2017/115010.

*Primary Examiner* — Euncha P Cherry
(74) *Attorney, Agent, or Firm* — Dragon Sun Law Firm, PC; Jinggao Li, Esq.

(57) ABSTRACT

Provided is a generation method for a programmable analog fringe pattern with an extended depth of field. A laser emits a laser beam. After focusing and collimation thereof with a collimating lens, a collimated Gaussian laser beam meeting requirements is obtained. The laser beam is reflected by a mirror once, passes through a round diaphragm and is incident on a MEMS scanning mirror. The beam is reflected by the MEMS scanning mirror to the surface of a tested object. The laser is controlled by a sinusoidal current signal generated by a drive board so as to sinusoidally modulate the brightness of the laser beam. The MEMS scanning mirror is stimulated by a drive signal generated by the drive board to turn two-dimensionally, so as to drive the laser beam to perform scanning, thus generating a fringe pattern image.

7 Claims, 4 Drawing Sheets

(51) Int. Cl.
    *G01B 11/25* (2006.01)
    *G02B 27/30* (2006.01)
(58) Field of Classification Search
    USPC ...................................................... 359/199.1
    See application file for complete search history.

(56) References Cited

U.S. PATENT DOCUMENTS

2009/0051991 A1* 2/2009 Kuribayashi ........ G02B 26/123
                                                        359/197.1
2013/0321823 A1* 12/2013 Takahashi .............. G01B 11/24
                                                        356/601

FOREIGN PATENT DOCUMENTS

| CN | 106052592 A | 10/2016 |
| CN | 106705889 A | 5/2017 |
| CN | 106767527 A | 5/2017 |
| CN | 107193123 A | 9/2017 |

* cited by examiner

GENERATION METHOD FOR PROGRAMMABLE ANALOG FRINGE PATTERN WITH EXTENDED DEPTH OF FIELD

CROSS-REFERENCE TO RELATED APPLICATIONS

This application is a bypass continuation application of PCT Application No. PCT/CN2017/115010. This Application claims priority from PCT Application No. PCT/CN2017/115010 filed Dec. 7, 2017, CN Application No. CN 201611115894 filed Dec. 7, 2016, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

FIELD

The present disclosure relates to the field of optical detection, and relates to a method for generating a fringe pattern, in particular to a generation method for a programmable analog fringe pattern with an extended depth of field.

BACKGROUND

As a bridge between the real world and the virtual digital world, three-dimensional measurement technology has become increasingly important. It is widely used in many industries such as industrial inspection, medical and health, digital entertainment, e-commerce, cultural relics protection and so on. Optical 3D measurement has developed into the most important technology in the field of 3D inspection due to its advantages of non-contact, high accuracy and fast speed. Optical 3D measurement can include two types: an active type and a passive type. A passive measurement method is represented by stereo vision. Stereo vision technology is simple in system structure and low in cost, but has the bottleneck of "difficult matching", and also has the disadvantages of a huge amount of computation and poor robustness. Active 3D measurement technology includes a time-of-flight method, a structured light projection method, and an interference method, etc. Among them, the structured light projection method is the most widely used due to a simple system, a low cost, and high accuracy.

In the structured light projection method, specific coded light is usually projected onto the surface of a tested object, a modulation signal of the coded light on the surface of the object is captured by a camera, further demodulation is carried out to obtain a modulation signal related to depth information, and finally calibration is performed to obtain a three-dimensional contour of the surface of the object. The projected coded light usually includes: a sine/cosine fringe pattern image, Gray code, color coding, random shape coding, etc. A sine/cosine fringe pattern image projection measurement method is most commonly used because it is a phase measurement method with high accuracy and good robustness. In early days, projection was mainly achieved by etching on glass or other materials to produce a projection pattern, such as a Ronchi fringe pattern. With the rapid development of the semiconductor industry, various digital projection devices have appeared in the 1990s, such as using digital light projection measurement technology including LCD (Liquid Crystal Display) technology, DLP (Digital Light Processing) technology, and LCOS (Liquid Crystal On Silicon)) technology. In digital light technology, a digitized signal is projected onto the surface of an object, so it has the advantage of programmable signals. This advantage makes time-domain unwrapping technology possible, and can improve the measurement accuracy by projecting different coded signals onto the surface of the object. A disadvantage of the digital light technology is the limitation of resolution, which is usually at the level of 1280×800. A high-resolution digital projection chip is very expensive. Whereas projected onto the surface of the object through a physical fringe pattern is an analog signal, that is, a continuous signal, so the resolution is very high (it can be considered as an infinite resolution). However, the physical fringe pattern has the disadvantages that a projection pattern is fixed and it is inflexible to use. In addition, no matter which of the digital light projection technology and the physical fringe pattern is used, a simulation pattern projected thereby is an image of a negative film, involving an imaging relationship, so there is a limitation of the depth of field, thus greatly restricting the range of two-dimensional measurement.

Therefore, a heretofore unaddressed need exists in the art to address the aforementioned deficiencies and inadequacies.

SUMMARY

An object of the present disclosure is providing a generation method for a programmable analog fringe pattern with an extended depth of field. In this method, a laser beam is used as a light source, and is reflected to the surface of an object through a two-dimensional MEMS scanning mirror, which is stimulated by drive currents in a fast axis direction and a slow axis direction to perform two-dimensional scanning At the same time, the light intensity of the laser is subjected to sinusoidal (or cosinusoidal) modulation. In this way, a continuously distributed sine (or cosine) light field is formed on the surface of the tested object.

The object of the present disclosure is achieved by the following technical solution:

A generation method for a programmable analog fringe pattern with an extended depth of field is carried out by steps as follows: a laser emits a laser beam, and after focusing and collimation thereof with a collimating lens, a collimated Gaussian laser beam meeting requirements is obtained; the laser beam is reflected by a mirror once, passes through a round diaphragm and is incident on an MEMS scanning mirror; the beam is reflected by the MEMS scanning mirror to the surface of a tested object; the laser is controlled by a sinusoidal current signal generated by a drive board so as to sinusoidally modulate the brightness of the laser beam; the MEMS scanning mirror is stimulated by a drive signal generated by the drive board to turn two-dimensionally, so as to drive the laser beam to perform scanning, thus generating a fringe pattern image.

Specific steps are as follows:

a first step of setting optical parameters of a system: determining an operating range of the fringe pattern, and determining, according to an operating distance of the fringe pattern, a maximum operating distance $L_2$ and a minimum operating distance $L_1$; a maximum spot radius $\omega_{max}$ within the range of the depth of field $\Delta L$; and a number M of lines scanned for a single frame of the fringe pattern image, wherein M is determined by characteristics of the laser beam;

a second step of generating drive signals: 1) a fast-axis drive signal of the MEMS scanning mirror; 2) a slow-axis drive signal of the MEMS scanning mirror; and 3) a drive signal of the laser; and a third step of generating fringe patterns: driving, by the galvanometer drive signals generated in the second step, the MEMS scanning mirror to perform two-dimensional scanning; driving, by the laser drive signal generated in the second step, the laser to generate a laser beam with continuously modulated light intensity; radiating the laser beam to the surface of the galvanometer at a certain incident angle, and then reflecting the same by the galvanometer to the surface of the object to form an analog fringe pattern light field with continuously modulated light intensity; and changing a frequency and a phase of the laser drive signal to obtain fringe patterns with different fringe pattern pitches and phases.

The fast-axis drive signal of the MEMS scanning mirror is a current signal with a sinusoidal waveform or a current signal with a cosine waveform, a frequency $f_x$ of which is equal to a resonance frequency f in a fast axis direction of the MEMS scanning mirror, and a peak-to-peak value $I_x$ of which is determined by parameters of the MEMS scanning mirror.

The slow-axis drive signal of the MEMS scanning mirror is a current signal with a sinusoidal waveform or a current signal with a cosine waveform or a current signal with a triangular waveform, a frequency $f_y$ of which is equal to $f_x/M$, and a peak-to-peak value $I_y$ of which is determined by parameters of the MEMS scanning mirror.

The drive signal of the laser is a sinusoidal current signal or a cosine current signal, a frequency of which determines a width of the fringe pattern for projecting the sinusoidal current signal or the cosine current signal, and a highest frequency $f_{LD}$ of which is determined by characteristics of the laser beam.

The highest frequency $f_{LD}$ is calculated as follows:

a fringe pattern obtained by scanning with the Gaussian beam at different distances is equivalent to an ideal fringe pattern image filtered by a linear Gaussian low-pass filter; for simplicity, only one direction is considered, and a Fourier transformation of intensity distribution of a laser Gaussian spot is expressed as:

$$H(u)=\sqrt{2\pi}\omega e^{-\pi^2 \omega^2(L_0)u^2}$$

wherein $\omega(L_0)$ is a waist radius of the Gaussian spot at a projection plane $L_0$, e is a natural constant, and u is a frequency;

A Fourier transformation of an ideal fringe pattern is:

$$F(u)=\delta(u)+0.5\times B[\delta(u+u_0)+\delta(u-u_0)];$$

wherein $\delta$ is an impulse function, B is a contrast of a trigonometric function, and $u_0$ is a reference frequency corresponding to the trigonometric function.

According to the convolution theorem, spatial filtering is equivalent to frequency domain multiplication, that is:

$$F(u)H(u)=H(0)+0.5\times B[H(u+u_0)+H(u-u_0)];$$

Assuming that a contrast of the fringe pattern image drops to 1/K of an original value, so that the image is blurred to a degree that seriously affects the accuracy of measurement, when H(u)=H(0)/K, the corresponding u is solved as a maximum frequency $f_0$ of the fringe pattern without blur;

similarly, maximum frequencies $f_1$ and $f_2$ at $L_1$ and $L_2$ are calculated; and a maximum frequency of the drive signal of the laser is $f_{LD}=\max(f_1, f_2)$.

Optical parameters of a system are set by the steps as follows:

1) determining an operating range of the fringe pattern:

after the Gaussian laser beam emitted by the laser passes through the collimating lens, the laser beam is incident on the MEMS scanning mirror, and then is reflected to the surface of the object, with a focal plane of the Gaussian beam being located at $L_0$, and a design depth of field being $\Delta L$, calculating, according to an ABCD matrix, a spot size of the beam after passing through the lens, a spot size $\omega_2$ at the maximum operating distance $L_2$, and a spot size $\omega_1$ at the minimum operating distance $L_1$ are calculated, and finally $L_1$ and $L_2$ are determined by the following formula 1-1;

$$\begin{cases} \dfrac{L_1}{L_2} = \dfrac{\omega_1}{\omega_2} \\ \Delta L = L_2 - L_1 \\ \omega_1 = f(L_1) \\ \omega_2 = f(L_2) \end{cases} \quad \text{formula 1-1}$$

2) calculating optical resolution:

the optical resolution is determined by spot characteristics and rotation angles of the galvanometer; the rotation angles of the galvanometer at a fast axis and a slow axis are $\theta_x$ and $\theta_y$, and the number M of lines is calculated according to formula 1-2;

$$M = \dfrac{2L_1 \times \tan\dfrac{\theta_y}{2}}{\omega_1} \quad \text{formula 1-2}$$

Fringe pattern generation is performed by the steps as follows: focusing and collimating a laser beam emitted from a laser with a collimating lens to obtain a collimated Gaussian laser beam meeting design requirements of the first step; in order to reduce the light path volume, reflecting the laser beam by a mirror once, and causing the laser beam to pass through a round diaphragm and be incident on an MEMS scanning mirror, wherein the diaphragm functions to remove stray light around the beam and improve spot shape quality; reflecting the beam by the MEMS scanning mirror to the surface of a tested object; controlling the laser by a sinusoidal current signal generated by a drive board so as to sinusoidally or cosinusoidally modulate on the brightness of the laser beam; stimulating the MEMS scanning mirror by a drive signal generated by the drive board to turn two-dimensionally, so as to drive the laser beam to perform scanning, thus generating a fringe pattern.

Beneficial Effects

In the present disclosure, a fringe pattern is generated by scanning with a laser beam, and the depth of field of the generated fringe pattern is extended by more than 10 times as compared with the digital light technology and physical fringe pattern technology, and the measurement range is greatly improved. The fringe pattern generated in the present disclosure is a programmable, spatially continuously distributed analog fringe pattern, and a roundoff error of discretization is reduced as compared with the digital light technology. In addition, a minimum fringe pattern pitch of the generated fringe pattern is very small, so the accuracy of 3D measurement can be greatly improved.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

Figure 1:
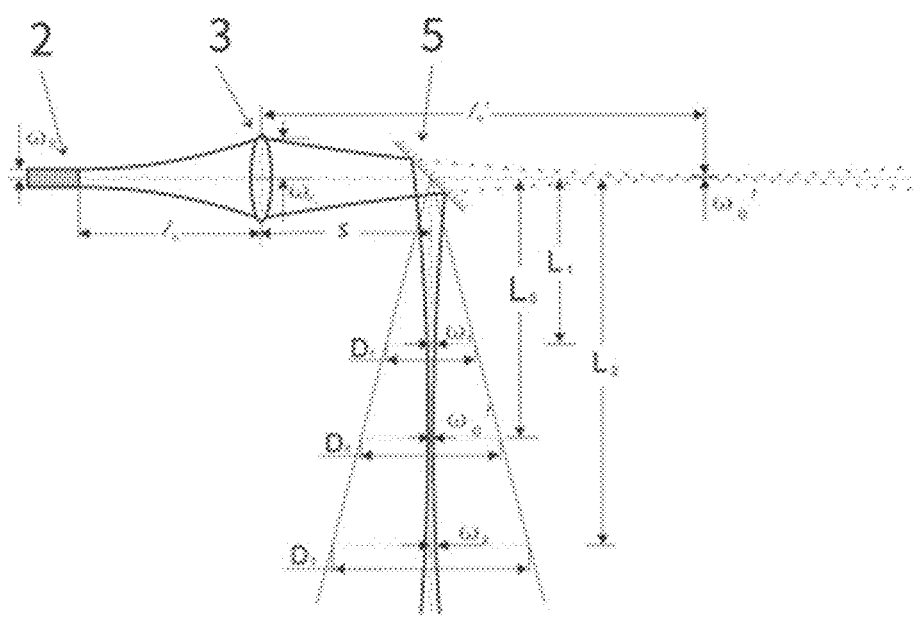
FIG. 1 is a working principle diagram of the present disclosure.

Reference numerals: 1: drive board; 2: laser; 3: collimating lens; 4: mirror; 5: MEMS scanning mirror; 6: aspheric lens; 7: fringe pattern image; 8: round diaphragm; 9: laser beam; 10: computer.

DETAILED DESCRIPTION OF THE EMBODIMENTS

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

Embodiments of the invention are illustrated in detail hereinafter with reference to accompanying drawings. It should be understood that specific embodiments described herein are merely intended to explain the invention, but not intended to limit the invention.

The present disclosure will be described in detail below in conjunction with the accompanying drawings.

Technical Solution:

The first step, operating parameters of a system are set: according to an operating distance of the fringe pattern, a maximum operating distance $L_2$ and a minimum operating distance $L_1$; a maximum spot $\omega_{max}$ within the range of the depth of field $\Delta L$; and a number M of lines scanned for a single frame of the fringe pattern image are determined, wherein M is determined by characteristics of the laser beam.

The second step, drive signals are generated: three types of drive signals are involved: 1) a fast-axis drive signal of the MEMS scanning mirror, which is a current signal with a sinusoidal (or cosine) waveform, a frequency $f_x$ of which is equal to a resonance frequency f in a fast axis direction of the MEMS scanning mirror, and a peak-to-peak value $I_x$ of which is determined by parameters of the MEMS scanning mirror; 2) a slow-axis drive signal of the MEMS scanning mirror, which is a current signal with a sinusoidal (or cosine) or triangular waveform, a frequency $f_y$ of which is equal to $f_x/M$, and a peak-to-peak value $I_y$ of which is determined by parameters of the MEMS scanning mirror; and 3) a drive signal of the laser, which is a sinusoidal (or cosine) current signal, a highest frequency $f_{LD}$ of which is determined by characteristics of the laser beam, and a peak-to-peak value and a bias current of which are determined by characteristics of the laser. The aforementioned three types of drive signals are all analog signals.

The third step, fringe patterns are generated: the MEMS scanning mirror is driven to perform two-dimensional scanning by the galvanometer drive signals generated in the second step; the laser is driven to generate a laser beam with continuously modulated light intensity by the laser drive signal generated in the second step; the laser beam is irradiated to the surface of the galvanometer at a certain incident angle, and then is reflected by the galvanometer to the surface of the object to form an analog fringe pattern light field with continuously modulated light intensity; and a frequency and a phase of the laser drive signal are changed to obtain fringe patterns with different fringe pattern pitches and phases.

Specifically, the following steps are included:

The first step, parameters of a system are set:

3) an operating range of the fringe pattern is determined:

As shown in FIG. 1, after the Gaussian laser beam emitted by the laser 11 passes through the collimating lens 12, the laser beam is incident on the MEMS scanning mirror 13, and then is reflected to the surface of the object, with a focal plane of the Gaussian beam being located at $L_0$, and a design depth of field being $\Delta L$. Calculation is performed according to an ABCD matrix to obtain a spot size of the beam after passing through the lens, a spot size $\omega_2$ at the maximum operating distance $L_2$, and a spot size $\omega_1$ at the minimum operating distance $L_1$, and finally $L_1$ and $L_2$ are determined by the following formula 1-1.

$$\begin{cases} \dfrac{L_1}{L_2} = \dfrac{\omega_1}{\omega_2} \\ \Delta L = L_2 - L_1 \\ \omega_1 = f(L_1) \\ \omega_2 = f(L_2) \end{cases} \qquad \text{formula 1-1}$$

4) optical resolution is calculated:

The optical resolution is determined by spot characteristics and rotation angles of the galvanometer. The rotation angles of the galvanometer at a fast axis and a slow axis are $\theta_x$ and $\theta_y$. The number M of lines is calculated according to formula 1-2.

$$M = \dfrac{2L_1 \times \tan\dfrac{\theta_y}{2}}{\omega_1} \qquad \text{formula 1-2}$$

The second step, drive signals are generated:

1) A fast-axis drive signal of the MEMS scanning mirror. The drive signal is a current signal, and current and voltage characteristics of which are determined by electrical characteristics of the MEMS scanning mirror used. Its frequency $f_x$ is equal to a resonance frequency f in a fast axis direction of the MEMS scanning mirror.

2) A slow-axis drive signal of the MEMS scanning mirror. The drive signal is a current signal, generally a sinusoidal or triangular signal, current and voltage characteristics of which are determined by electrical characteristics of the MEMS scanning mirror used. Its frequency is $f_y=f_x/M$.

3) A drive signal of the laser.

The drive signal is a sinusoidal (or cosine) current signal. Its current and voltage characteristics are determined by electrical characteristics of the laser. The frequency of the signal determines a width of the fringe pattern for projecting the sine or cosine current signal, thus affecting the accuracy of measurement. Its highest frequency is calculated as follows:

A fringe pattern obtained by scanning with the Gaussian beam at different distances is equivalent to an ideal fringe pattern image filtered by a linear Gaussian low-pass filter. During the scanning process of the MEMS scanning mirror, as a laser Gaussian spot has a certain size, it can have a blurring effect on the fringe pattern image. Its function is equivalent to an ideal fringe pattern image filtered by a linear Gaussian low-pass filter. For simplicity, only a direction X is considered, and a Fourier transformation of intensity distribution of a laser Gaussian spot can be expressed as:

$$H(u)=\sqrt{2\pi}e^{-\pi^2\omega^2(L_0)u^2}$$

wherein $\omega(L_0)$ is a waist radius of the Gaussian spot at a projection plane $L_0$. A Fourier transformation of an ideal fringe pattern is:

$$F(u)=\delta(u)+0.5\times B[\delta(u+u_0)+\delta(u-u_0)];$$

According to the convolution theorem, spatial filtering is equivalent to frequency domain multiplication, that is:

$$F(u)H(u)=H(0)+0.5\times B[H(u+u_0)+H(u-u_0)];$$

Assuming that a contrast of the fringe pattern image drops to 1/e of an original value, so that the image is blurred to a degree that seriously affects the accuracy of measurement, when $H(u-u_0)=H(0)/e$, the corresponding $u_0=1/[\pi\omega(L_0)]$ is solved as a maximum frequency $f_0$ of the fringe pattern without blur. Similarly, maximum frequencies $f_1$ and $f_2$ at $L_1$ and $L_2$ are calculated.

A maximum frequency of the drive signal of the laser is $f_{LD}=\max(f_1, f_2)$.

Signal Timing Relationship

Figure 2:
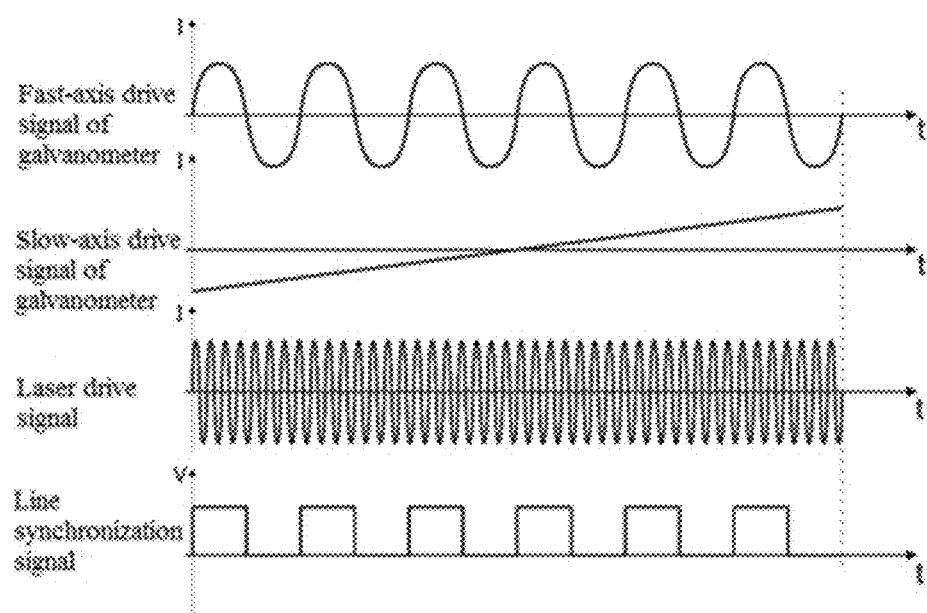
FIG. 2 is a timing relationship diagram of a line synchronization signal in the present disclosure.

After projection of a frame of fringe pattern image is completed, a timing relationship between a fast-axis drive signal and a slow-axis drive signal of the MEMS scanning mirror, a drive signal of the laser, and a line synchronization signal is as shown in FIG. 2.

Figure 3:
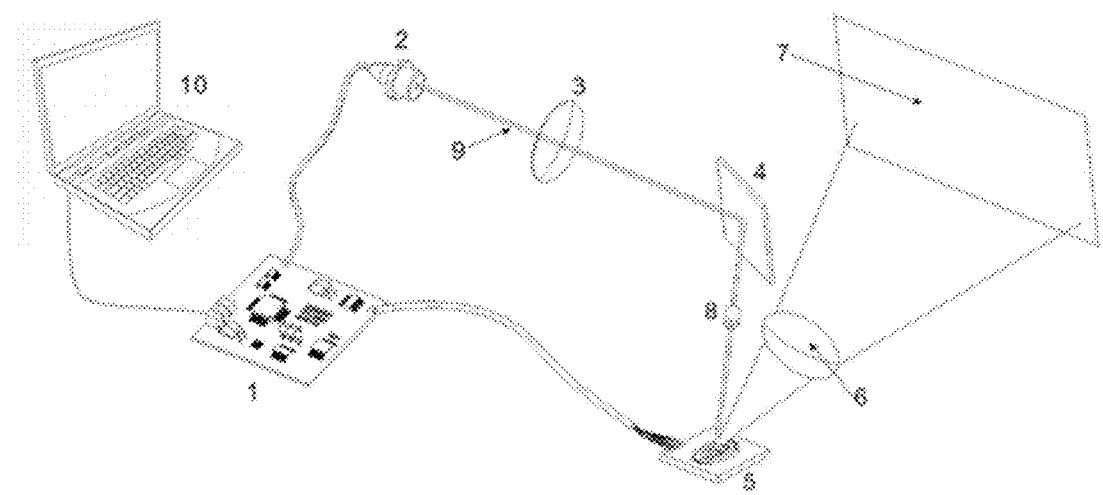
FIG. 3 is a system structure diagram of the present disclosure.
Figure 4:
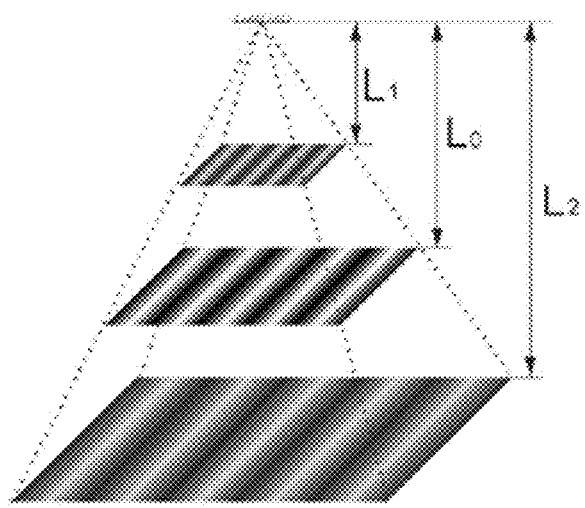
FIG. 4 is a schematic diagram of a contrast within an operating range of a fringe pattern of the present disclosure.

The third step, fringe patterns are generated:

As shown in FIG. 3, a laser beam emitted by a laser (which can be a plurality of lasers in different bands) is focused and collimated with a collimating lens to obtain collimated Gaussian laser beam meeting design requirements of the first step. In order to reduce the light path volume, the laser beam is reflected by a mirror once, and the laser beam passes through a round diaphragm and is incident on an MEMS scanning mirror. The diaphragm functions to remove stray light around the beam and improve spot shape quality. The beam is reflected by the MEMS scanning mirror to the surface of a tested object. The laser is controlled by a sinusoidal current signal generated by a drive board so as to sinusoidally or cosinusoidally modulate the brightness of the laser beam. The MEMS scanning mirror is stimulated by a drive signal generated by the drive board to turn two-dimensionally, so as to drive the laser beam to perform scanning, thus generating a fringe pattern. An aspheric lens can correct the distortion of the fringe pattern image to ensure that a high-quality fringe pattern image without distortion is obtained. Programmed control of fringe pattern pitches and phases can be achieved by changing a frequency and a phase of the laser drive signal. In the method, as a divergence angle of the laser beam is small, and the fringe pattern frequency is estimated in the second step, the obtained fringe patterns have a very good contrast within the operating range, as shown in FIG. 4.

The above description only involves preferred embodiments of the present disclosure, and does not limit the present disclosure in any form. Although the present disclosure has been disclosed as above with the preferred embodiments, the present disclosure is not limited thereto. Those skilled in the art can use the disclosed methods and technical contents described above to make some changes or modifications to produce equivalent embodiments without departing from the technical solutions of the present disclosure. All simple modifications, equivalent changes, and modifications made to the above embodiments according to the technical essence of the present disclosure without departing from the technical solutions of the present disclosure still fall within the scope of the technical solutions of the present disclosure.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A generation method for a programmable analog fringe pattern with an extended depth of field, comprising steps as follows: focusing and collimating a laser beam emitted from a laser with a collimating lens to obtain a collimated Gaussian laser beam meeting requirements; causing the laser beam to pass through a diaphragm and be incident on an MEMS scanning mirror; reflecting the beam by the MEMS scanning mirror to the surface of a tested object; controlling the laser by a sinusoidal current signal generated by a drive board so as to sinusoidally modulate the brightness of the laser beam; stimulating the MEMS scanning mirror by a drive signal generated by the drive board to turn two-dimensionally, so as to drive the laser beam to perform scanning, thus generating a fringe pattern image; and changing a period and a phase of a drive signal of the laser to obtain fringe pattern images with different periods and phases; wherein the generation method further comprises:

a first step of setting optical parameters of a system: determining an operating range of the fringe pattern, and determining, according to an operating distance of the fringe pattern, a maximum operating distance $L_2$ and a minimum operating distance $L_1$; a maximum spot radius $\omega_{max}$ within the range of the depth of field $\Delta L$; and a number M of lines scanned for a single frame of the fringe pattern image;

a second step of generating drive signals: calculating parameters of drive signals of the MEMS scanning mirror and the laser according to the system parameters determined in the first step, and generating the drive signals, which comprise: 1) a fast-axis drive signal of the MEMS scanning mirror; 2) a slow-axis drive signal of the MEMS scanning mirror; and 3) a drive signal of the laser; and a third step of generating fringe patterns: driving, by the galvanometer drive signals generated in the second step, the MEMS scanning mirror to perform two-dimensional scanning; driving, by the laser drive signal generated in the second step, the laser to generate a laser beam with continuously modulated light intensity; radiating the laser beam to the surface of the galvanometer at a certain incident angle, and then reflecting the same by the galvanometer to the surface of the object to form an analog fringe pattern light field with continuously modulated light intensity; and changing a frequency and a phase of the laser drive signal to obtain fringe patterns with different fringe pattern pitches and phases.

2. The generation method for a programmable analog fringe pattern with an extended depth of field according to claim 1, wherein the fast-axis drive signal of the MEMS scanning mirror is a current signal with a sinusoidal waveform or a current signal with a cosine waveform, a frequency $f_x$ of which is equal to a resonance frequency f in a fast axis direction of the MEMS scanning mirror, and a peak-to-peak value $I_x$ of which is determined by parameters of the MEMS scanning mirror.

3. The generation method for a programmable analog fringe pattern with an extended depth of field according to claim 1, wherein the slow-axis drive signal of the MEMS scanning mirror is a current signal with a sinusoidal waveform or a current signal with a cosine waveform or a current signal with a triangular waveform, a frequency $f_y$ of which is equal to $f_x/M$, and a peak-to-peak value $I_y$ of which is determined by parameters of the MEMS scanning mirror.

4. The generation method for a programmable analog fringe pattern with an extended depth of field according to claim 1, wherein the drive signal of the laser is a sinusoidal current signal or a cosine current signal, a frequency of which determines a width of the fringe pattern for projecting the sinusoidal current signal or the cosine current signal, and a highest frequency $f_{LD}$ of which is determined by characteristics of the laser beam.

5. The generation method for a programmable analog fringe pattern with an extended depth of field according to claim 4, wherein the highest frequency $f_{LD}$ is calculated as follows:

a fringe pattern obtained by scanning with the Gaussian beam at different distances is equivalent to an ideal fringe pattern image filtered by a linear Gaussian low-pass filter; for simplicity, only one direction is considered, and a Fourier transformation of intensity distribution of a laser Gaussian spot is expressed as:

$H(u) = \sqrt{2\pi} e^{-\pi^2 \omega^2 (L_0) u^2}$ wherein $\omega(L_0)$ is a waist radius of the Gaussian spot at a projection plane $L_0$, e is a natural constant, and u is a frequency;

a Fourier transformation of an ideal fringe pattern is:

$F(u) = \delta(u) + 0.5 \times B[\delta(u+u_0) + \delta(u-u_0)]$;

wherein $\delta$ is an impulse function, B is a contrast of a trigonometric function, and $u_0$ is a reference frequency corresponding to the trigonometric function;

according to the convolution theorem, spatial filtering is equivalent to frequency domain multiplication, that is:

$F(u)H(u) = H(0) + 0.5 \times B[H(u+u_0) + H(u-u_0)]$ assuming that a contrast of the fringe pattern image drops to 1/K of an original value, the image is blurred to a degree that seriously affects the accuracy of measurement, when $H(u) = H(0)/K$, the corresponding u is solved as a maximum frequency $f_0$ of the fringe pattern without blur; similarly, maximum frequencies $f_1$ and $f_2$ at $L_1$ and $L_2$ are calculated; and a maximum frequency of the drive signal of the laser is $f_{LD} = \max(f_1, f_2)$.

6. The generation method for a programmable analog fringe pattern with an extended depth of field according to claim 1, wherein setting optical parameters of a system comprises steps as follows:

1) determining an operating range of the fringe pattern:
after the Gaussian laser beam emitted by the laser passes through the collimating lens, the laser beam is incident on the MEMS scanning mirror, and then is reflected to the surface of the object, with a focal plane of the Gaussian beam being located at $L_0$, and a design depth of field being $\Delta L$, according to an ABCD matrix, a spot size of the beam after passing through the lens, a spot size $\omega_2$ at the maximum operating distance $L_2$, and a spot size $\omega_1$ at the minimum operating distance $L_1$ are calculated, and finally $L_1$ and $L_2$ are determined by the following formula 1-1;

$$\begin{cases} \dfrac{L_1}{L_2} = \dfrac{\omega_1}{\omega_2} \\ \Delta L = L_2 - L_1 \\ \omega_1 = f(L_1) \\ \omega_2 = f(L_2) \end{cases} \quad \text{formula 1-1}$$

2) calculating optical resolution:
the optical resolution is determined by spot characteristics and rotation angles of the galvanometer; the rotation angles of the galvanometer at a fast axis and a slow axis are $\theta_x$ and $\theta_y$, and the number M of lines is calculated according to formula 1-2;

$$M = \dfrac{2L_1 \times \tan\dfrac{\theta_y}{2}}{\omega_1}. \quad \text{formula 1-2}$$

7. The generation method for a programmable analog fringe pattern with an extended depth of field according to claim 1, wherein fringe pattern generation is performed by the steps as follows: focusing and collimating a laser beam emitted from a laser with a collimating lens to obtain a collimated Gaussian laser beam meeting design requirements of the first step; in order to reduce the light path volume, reflecting the laser beam by a mirror once, and causing the laser beam to pass through a round diaphragm and be incident on an MEMS scanning mirror, wherein the diaphragm functions to remove stray light around the beam and improve spot shape quality; reflecting the beam by the MEMS scanning mirror to the surface of a tested object; controlling the laser by a sinusoidal current signal generated by a drive board so as to sinusoidally or cosinusoidally modulate the brightness of the laser beam; stimulating the MEMS scanning mirror by a drive signal generated by the drive board to turn two-dimensionally, so as to drive the laser beam to perform scanning, thus generating a fringe pattern.

\* \* \* \* \*